(12) United States Patent
Li

(10) Patent No.: US 12,441,652 B2
(45) Date of Patent: *Oct. 14, 2025

(54) GLASS COMPOSITIONS, FIBERIZABLE GLASS COMPOSITIONS, AND GLASS FIBERS MADE THEREFROM

(71) Applicant: Electric Glass Fiber America, LLC, Shelby, NC (US)

(72) Inventor: Hong Li, Stanley, NC (US)

(73) Assignee: Electric Glass Fiber America, LLC, Shelby, NC (US)

( * ) Notice: Subject to any disclaimer, the term of this patent is extended or adjusted under 35 U.S.C. 154(b) by 47 days.

This patent is subject to a terminal disclaimer.

(21) Appl. No.: 18/299,242

(22) Filed: Apr. 12, 2023

(65) Prior Publication Data

US 2023/0250010 A1    Aug. 10, 2023

Related U.S. Application Data

(63) Continuation of application No. 16/293,343, filed on Mar. 5, 2019, now Pat. No. 11,697,611.

(60) Provisional application No. 62/639,731, filed on Mar. 7, 2018.

(51) Int. Cl.
| | |
|---|---|
| *C03C 3/087* | (2006.01) |
| *C03C 3/095* | (2006.01) |
| *C03C 3/112* | (2006.01) |
| *C03C 13/00* | (2006.01) |
| *C08J 5/04* | (2006.01) |

(52) U.S. Cl.
CPC .............. *C03C 3/087* (2013.01); *C03C 3/095* (2013.01); *C03C 3/112* (2013.01); *C03C 13/00* (2013.01); *C08J 5/043* (2013.01); *C03C 2213/00* (2013.01); *C08J 2300/24* (2013.01)

(58) Field of Classification Search
CPC .......... C03C 3/087; C03C 3/095; C03C 13/00
See application file for complete search history.

(56) References Cited

U.S. PATENT DOCUMENTS

| 11,697,611 B2 * | 7/2023 | Li .......................... C03C 3/087 |
| | | 501/38 |
| 2017/0101338 A1 | 4/2017 | Li et al. |
| 2017/0283309 A1 | 10/2017 | Cao et al. |
| 2018/0179104 A1 | 6/2018 | Zhang et al. |

FOREIGN PATENT DOCUMENTS

| CN | 103153895 | 6/2013 |
| CN | 103153896 | 6/2013 |
| CN | 103596897 | 2/2014 |
| CN | 105392744 | 3/2016 |
| CN | 106795040 | 5/2017 |
| WO | 2013/036736 | 3/2013 |
| WO | 2016/165530 | 10/2016 |

OTHER PUBLICATIONS

Loewenstein, K. L., "The manufacturing technology of continuous glass fibers," Third Edition, Elsevier, N.Y., pp. 47-48, 117-234 (1993).
CN 201980021553.6, Office Action, Apr. 8, 2022, 29 pages.
IN 202037038094, First Examination Report, Mar. 16, 2022, 7 pages.
PCT/US2019/020786, International Preliminary Report on Patentability, Sep. 17, 2020, 7 pages.
PCT/US2019/020786, International Search Report and Written Opinion, Jun. 4, 2019, 11 pages.

* cited by examiner

*Primary Examiner* — Elizabeth A. Bolden
(74) *Attorney, Agent, or Firm* — Kilpatrick Townsend & Stockton, LLP

(57) ABSTRACT

Glass compositions suitable for fiber forming having low levels of $Li_2O$ and glass fibers having high-modulus are disclosed. The glass composition may include $SiO_2$ from about 59 to about 63 weight percent, $Al_2O_3$ from about 13.7 to about 16 weight percent, CaO from about 14 to about 16.5 weight percent, MgO from about 6 to about 8.5 weight percent, $Fe_2O_3$ less than 1 weight percent, and $TiO_2$ less than 1 weight percent. In some cases, the composition may be substantially free of $Li_2O$. In some cases, the composition may include $Li_2O$ up to 0.5 weight percent. In some cases, $RE_2O_3$ may be present in the composition in an amount up to 1.5 weight percent. The glass compositions can be used to form glass fibers which can be incorporated into a variety of other fiber glass products (e.g., strands, rovings, fabrics, etc.) and incorporated into various composites.

20 Claims, No Drawings

GLASS COMPOSITIONS, FIBERIZABLE GLASS COMPOSITIONS, AND GLASS FIBERS MADE THEREFROM

PRIORITY

This application is a continuation of U.S. patent application Ser. No. 16/293,343, filed Mar. 5, 2019, which claims the benefit of and priority to U.S. Provisional Patent Application No. 62/639,731, filed Mar. 7, 2018, each of which are hereby incorporated by reference as though fully set forth herein.

FIELD

Described herein are glass compositions, and in particular, glass compositions for forming fibers.

BACKGROUND

Glass fibers have been used to reinforce various polymeric resins for many years. Some commonly used glass compositions for use in reinforcement applications include the "E-glass," "R-glass," and "D-glass" families of compositions. "S-glass" is another commonly used family of glass compositions that includes, for example, glass fibers commercially available from AGY (Aiken, South Carolina) under the trade name "S-2 Glass."

Glass fibers fall into two categories: general purpose and special purpose. The most widely used glass fiber types are general purpose, also known as E-Glass fibers. Overall E-Glass offers good mechanical, electrical and corrosion properties.

As the possible market applications of composites continue to grow, users of glass fibers have faced challenges to meet the demands related to performance, cost, reliability and durability, as well as the increased focus on sustainability and environmental stewardship. Included among the challenges are: the length requirements of wind blades continue to grow; power plants want maximum performance and lifetime from pipes and tanks in harsh conditions and environments; demands for fuel economy with sacrifice of performance are bringing changes to the automotive industry; and continued advancements in technology require the signal speed of circuit boards to be more robust than ever before.

Fiber glass manufacturers continue to seek glass compositions that can be used to form glass fibers having desirable mechanical properties in a commercial manufacturing environment.

SUMMARY

Various embodiments of the present invention provide glass compositions, fiberizable glass compositions, and glass fibers formed from such compositions, as well as fiber glass strands, yarns, fabrics, and composites comprising such glass fibers adapted for use in various applications.

In an embodiment, a glass composition suitable for fiber forming may comprise $SiO_2$ from about 60 to about 63 weight percent, $Al_2O_3$ from about 14 to about 16 weight percent, CaO from about 14 to about 16 weight percent, MgO from about 6 to about 8.5 weight percent, $Fe_2O_3$ less than 1 weight percent, and $TiO_2$ less than 1 weight percent, where the composition is substantially free of $Li_2O$ and the ($Li_2O+MgO+Al_2O_3$) content ranges from about 22 up to 24 weight percent.

In certain embodiments, a glass composition suitable for fiber forming may comprise $SiO_2$ from about 60 to about 63 weight percent, $Al_2O_3$ from about 14 to about 16 weight percent, CaO from about 14 to about 16 weight percent, MgO from about 6 to about 8.5 weight percent, $Fe_2O_3$ less than 1 weight percent, $TiO_2$ less than 1 weight percent, and rare earth oxide, $RE_2O_3$ in an amount greater than 0 weight percent and less than 1 weight percent, where the composition is substantially free of $Li_2O$.

In certain embodiments, a glass composition suitable for fiber forming may comprise $SiO_2$ from about 59 to about 63 weight percent, $Al_2O_3$ from about 13.7 to about 16 weight percent, CaO from about 14 to about 16.5 weight percent, MgO from about 6 to about 8.5 weight percent, $Fe_2O_3$ less than 1 weight percent, $TiO_2$ less than 1 weight percent, and rare earth oxide, $RE_2O_3$ in an amount greater than 0 weight percent and less than 1.5 weight percent, where the composition is substantially free of $Li_2O$.

In some cases, a glass composition suitable for fiber forming may comprise $SiO_2$ from about 60 to about 63 weight percent, $Al_2O_3$ from about 14 to about 16 weight percent, CaO from about 14 to about 16 weight percent, MgO from about 6 to about 8.5 weight percent, $Fe_2O_3$ less than 1 weight percent, $TiO_2$ less than 1 weight percent, $Li_2O$ less than 0.5 weight percent, and $RE_2O_3$ is present in an amount greater than 0 weight percent and less than 1 weight percent, where the ($Li_2O+MgO+Al_2O_3$) content ranges from about 22 up to 24 weight percent.

In some embodiments, a glass composition suitable for fiber forming may comprise $SiO_2$ from about 60 to about 63 weight percent, $Al_2O_3$ from about 14 to about 16 weight percent, CaO from about 14 to about 16 weight percent, MgO from about 6 to about 8.5 weight percent, $Fe_2O_3$ less than 1 weight percent, $TiO_2$ less than 1 weight percent, and $Li_2O$ is present in an amount greater than 0 weight percent and less than 0.5 weight percent, where the ($Li_2O+MgO+Al_2O_3$) content ranges from about 22 up to 23 weight percent.

In any of the foregoing embodiments, additional embodiments may include an $Al_2O_3/(Al_2O_3+MgO+CaO)$ ratio range between 0.33 to 0.47. In certain embodiments, the $Al_2O_3/(Al_2O_3+MgO+CaO)$ ratio may be less than 0.40. In some embodiments, the $Al_2O_3/(Al_2O_3+MgO+CaO)$ ratio may range from 0.37 to 0.42. In some embodiments, the $Al_2O_3/(Al_2O_3+MgO+CaO)$ ratio may range from 0.35 to 0.45.

Some embodiments of the present invention relate to fiber glass strands. A number of fiberizable glass compositions are disclosed herein as part of the present invention, and it should be understand that various embodiments of the present invention can comprise glass fibers, fiber glass strands, yarns, and other products incorporating glass fibers formed from such compositions. In one embodiment, a plurality of glass fibers formed from a glass composition may comprise $SiO_2$ from about 60 to about 63 weight percent, $Al_2O_3$ from about 14 to about 16 weight percent, CaO from about 14 to about 16 weight percent, MgO from about 6 to about 8.5 weight percent, $Fe_2O_3$ less than 1 weight percent, $TiO_2$ less than 1 weight percent, and $Li_2O$ is present in an amount greater than 0 weight percent and less than 0.5 weight percent, where the ($Li_2O+MgO+Al_2O_3$) content ranges from about 22 up to 24 weight percent and the Young's modulus is greater than 85 GPa.

Some embodiments of the present invention relate to yarns formed from at least one fiber glass strand formed from a glass composition described herein. Some embodiments of the present invention relate to fabrics incorporating at least one fiber glass strand formed from a glass composition described herein. In some embodiments, a fill yarn used in the fabric can comprise the at least one fiber glass strand. A warp yarn, in some embodiments, can comprise the at least one fiber glass strand. In some embodiments, fiber glass strands can be used in both fill yarns and warp yarns to form fabrics according to the present invention. In some embodiments, fabrics of the present invention can comprise a plain weave fabric, twill fabric, crowfoot fabric, satin weave fabric, stitch bonded fabric, or 3D woven fabric.

Some embodiments of the present invention relate to composites comprising a polymeric resin and glass fibers formed from one of the various glass compositions described herein. The glass fibers can be from a fiber glass strand according to some embodiments of the present invention. In some embodiments, the glass fibers can be incorporated into a fabric, such as a woven fabric. For example, the glass fibers can be in a fill yarn and/or a warp yarn that are woven to form a fabric. In embodiments where the composite comprises a fabric, the fabric can comprise a plain weave fabric, twill fabric, crowfoot fabric, satin weave fabric, stitch bonded fabric, or 3D woven fabric.

The glass fibers can be incorporated into the composite in other forms as well as discussed in more detail below.

Composites of the present invention may comprise one or more of a variety of polymeric resins. In some embodiments, the polymeric resin may comprise at least one of polyethylene, polypropylene, polyamide, polyimide, polybutylene terephthalate, polycarbonate, thermoplastic polyurethane, phenolic, polyester, vinyl ester, polydicyclopentadiene, polyphenylene sulfide, polyether ether ketone, cyanate esters, bis-maleimides, and thermoset polyurethane resins. The polymeric resin can comprise an epoxy resin in some embodiments.

Composites of the present invention can be in a variety of forms and can be used in a variety of applications. Some examples of potential uses of composites according to some embodiments of the present invention include, without limitation, wind energy (e.g., windmill blades), automotive applications, safety/security applications (e.g., ballistics armor), aerospace or aviation applications (e.g., interior floors of planes), high pressure vessels or tanks, missile casings, electronics, and others.

These and other embodiments of the present invention are described in greater detail in the Detailed Description that follows.

DETAILED DESCRIPTION OF THE INVENTION

Embodiments of the present invention relates generally to glass compositions. In one aspect, the present invention provides glass fibers formed from glass compositions described herein. Specifically, the glass compositions described herein may be free of $Li_2O$. Optionally, the compositions may comprise low amounts of lithium oxide ($Li_2O$). In some cases, the glass compositions may comprise one or more rare earth oxide ($RE_2O_3$). In some embodiments, glass fibers of the present invention can have improved mechanical properties, such as, for example, Young's modulus, as compared to conventional E-glass fibers. In some embodiments, the glass fibers may have a modulus greater than 85 GPa. In certain embodiments, the glass fibers may have a modulus greater than 88 GPa. In some embodiments, the glass fibers may have a density less than 2.7 g/cm3. In certain embodiments, the glass fibers may have a forming temperature ($T_F$) of less than 1350° C. In some embodiments, the glass fibers may have a liquidus temperature ($T_L$) of less than 1250° C. In some embodiments of glass compositions, the difference between the $T_F$ and the $T_F$ ("Delta T") may be greater than about 60° C. In certain embodiments, the glass compositions may have a melt temperature ($T_M$) of less than 1530° C.

Definitions and Descriptions

The terms "invention," "the invention," "the present invention," "embodiment," "certain embodiment," and the like are used herein are intended to refer broadly to all the subject matter of this patent application and the claims below. Statements containing these terms should be understood not to limit the subject matter described herein or to limit the meaning or scope of the patent claims below. The terms "comprising," "having," "including," and "containing" are to be construed as open-ended terms (i.e., meaning "including, but not limited to") unless otherwise noted. It is further noted that, as used in this specification, the singular forms "a," "an," and "the" include plural referents unless expressly and unequivocally limited to one referent.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, e.g., 5.5 to 10. Additionally, any reference referred to as being "incorporated herein" is to be understood as being incorporated in its entirety.

The glass compositions are described in terms of weight percentage (wt. %) based on the total weight of the composition.

Glass Compositions and Fibers

The invention may be embodied in a variety of ways. In some embodiments, a glass composition suitable for fiber forming may comprise $SiO_2$, $Al_2O_3$, CaO, MgO, $Fe_2O_3$, and $TiO_2$. Optionally, the composition may further comprise $RE_2O_3$. Optionally, the composition may further comprise $Li_2O$. In some embodiments, the composition may be substantially free of $Li_2O$.

In certain embodiments, the glass composition suitable for fiber forming as described herein may comprise $SiO_2$ from about 59 to about 63 weight percent (e.g., 60 wt. % to 63 wt. %). For example, the composition may include $SiO_2$ in an amount of about 59 wt. %, 59.1 wt. %, 59.2 wt. %, 59.3 wt. %, 59.4 wt. %, 59.5 wt. %, 59.6 wt. %, 59.7 wt. %, 59.8 wt. %, 59.9 wt. %, 60 wt. %, 60.1 wt. %, 60.2 wt. %, 60.3 wt. %, 60.4 wt. %, 60.5 wt. %, 60.6 wt. %, 60.7 wt. %, 60.8 wt. %, 60.9 wt. %, 61 wt. %, 61.1 wt. %, 61.2 wt. %, 61.3 wt. %, 61.4 wt. %, 61.5 wt. %, 61.6 wt. %, 61.7 wt. %, 61.8 wt. %, 61.9 wt. %, 62 wt. %, 62.1 wt. %, 62.2 wt. %, 62.3 wt. %, 62.4 wt. %, 62.5 wt. %, 62.6 wt. %, 62.7 wt. %, 62.8 wt. %, 62.9 wt. %, or 63 wt. %.

In some examples, the glass composition suitable for fiber forming as described herein may comprise $Al_2O_3$ from about 13.7 to about 16.5 weight percent (e.g., 14 wt. % to 16 wt. %). For example, the composition may include $Al_2O_3$ in an amount of about 13.7, 13.8, 13.9, 14 wt. %, 14.1 wt. %, 14.2 wt. %, 14.3 wt. %, 14.4 wt. %, 14.5 wt. %, 14.6 wt. %, 14.7 wt. %, 14.8 wt. %, 14.9 wt. %, 15 wt. %, 15.1 wt. %, 15.2 wt. %, 15.3 wt. %, 15.4 wt. %, 15.5 wt. % 15.6 wt. %, 15.7 wt. %, 15.8 wt. %, 15.9 wt. %, 16 wt. %, 16.1 wt. %, 16.2 wt. %, 16.3 wt. %, 16.4 wt. %, or 16.5 wt. %.

In some embodiments, the glass composition suitable for fiber forming as described herein may comprise CaO from about 14 to about 16.5 weight percent (e.g., 14 wt. % to 16 wt. %). For example, the composition may include CaO in an amount of about 14 wt. %, 14.1 wt. %, 14.2 wt. %, 14.3 wt. %, 14.4 wt. %, 14.5 wt. %, 14.6 wt. %, 14.7 wt. %, 14.8 wt. %, 14.9 wt. %, 15 wt. %, 15.1 wt. %, 15.2 wt. %, 15.3 wt. %, 15.4 wt. %, 15.5 wt. % 15.6 wt. %, 15.7 wt. %, 15.8 wt. %, 15.9 wt. %, 16 wt. %, 16.1 wt. %, 16.2 wt. %, 16.4 wt. %, or 16.5 wt. %.

In some embodiments, the glass composition suitable for fiber forming as described herein may comprise MgO from about 6 to about 8.5 weight percent (e.g., 6 wt. % to 8 wt. %). For example, the composition may include MgO in an amount of about 6 wt. %, 6.1 wt. %, 6.2 wt. %, 6.3 wt. %, 6.4 wt. %, 6.5 wt. %, 6.6 wt. %, 6.7 wt. %, 6.8 wt. %, 6.9 wt. %, 7 wt. %, 7.1 wt. %, 7.2 wt. %, 7.3 wt. %, 7.4 wt. %, 7.5 wt. %, 7.6 wt. %, 7.7 wt. %, 7.8 wt. %, 7.9 wt. %, 8 wt. %, 8.1 wt. %, 8.2 wt. %, 8.3 wt. %, 8.4 wt. %, or 8.5 wt. %.

In some embodiments, the glass composition suitable for fiber forming as described herein may comprise $Fe_2O_3$ in an amount less than 1 weight percent. For example, the composition may include $Fe_2O_3$ in an amount of about 0.25 wt. %, 0.3 wt. %, 0.35 wt. %, 0.4 wt. %, 0.45 wt. %, 0.5 wt. %, 0.55 wt. %, 0.6 wt. %, 0.65 wt. %, 0.7 wt. %, 0.75 wt. %, 0.8 wt. %, 0.85 wt. %, 0.9 wt. %, 0.95 wt. %, or up to 1.0 wt. %. In some cases, the composition may be substantially free of $Fe_2O_3$.

In some embodiments, the glass composition suitable for fiber forming as described herein may comprise $TiO_2$ in an amount less than 1 weight percent. For example, the composition may include $TiO_2$ in an amount of about 0.25 wt. %, 0.3 wt. %, 0.35 wt. %, 0.4 wt. %, 0.45 wt. %, 0.5 wt. %, 0.55 wt. %, 0.6 wt. %, 0.65 wt. %, 0.7 wt. %, 0.75 wt. %, 0.8 wt. %, 0.85 wt. %, 0.9 wt. %, 0.95 wt. %, or up to 1.0 wt. %. In some cases, the composition may be substantially free of $TiO_2$.

Optionally, some embodiments of the glass composition suitable for fiber forming as described herein may comprise $Li_2O$ in an amount less than 0.5 weight percent (e.g., less than 0.4 wt. %). For example, the composition may include $Li_2O$ in an amount of about 0.05 wt. %, 0.1 wt. %, 0.15 wt. %, 0.2 wt. %, 0.25 wt. %, 0.3 wt. %, 0.35 wt. %, 0.4 wt. %, 0.45 wt. %, or 0.5 wt %. In some cases, the composition may be substantially free of $Li_2O$.

Optionally, some embodiments of the glass composition suitable for fiber forming as described herein may comprise rare earth oxides ("$RE2O_3$") in an amount less than 1 weight percent. In some embodiments, the glass composition may comprise $RE2O_3$ in an amount less than 1.5 weight percent. For example, the composition may include $RE2O_3$ in an amount of about 0.2 wt. %, 0.25 wt. %, 0.3 wt. %, 0.35 wt. %, 0.4 wt. %, 0.45 wt. %, 0.5 wt. %, 0.55 wt. %, 0.6 wt. %, 0.65 wt. %, 0.7 wt. %, 0.75 wt. %, 0.8 wt. %, 0.85 wt. %, 0.9 wt. %, 0.95 wt. %, 1.0 wt. %, 1.1 wt. %, 1.2 wt. %, 1.3 wt. %, 1.4 wt. %, or up to 1.5 wt. %. As used herein, the term "rare earth oxides" as understood to those of skill in the art, refers to oxides incorporating a rare earth metal and includes oxides of scandium ($Sc_2O_3$), yttrium ($Y_2O_3$), and the lanthanide elements (lanthanum ($La_2O_3$), cerium ($Ce_2O_3$ and $CeO_2$), praseodymium ($Pr_2O_3$), neodymium ($Nd_2O_3$), promethium ($Pm_2O_3$), samarium ($Sm_2O_3$), europium ($Eu_2O_3$ and EuO), gadolinium ($Gd_2O_3$), terbium ($Tb_2O_3$), dysprosium ($Dy_2O_3$), holmium ($Ho_2O_3$), erbium ($Er_2O_3$), thulium ($Tm_2O_3$), ytterbium ($Yb_2O_3$), and lutetium ($Lu_2O_3$). The rare earth oxides may be included in the glass compositions of the present invention in amounts that exceed those wherein the rare earth oxide is present only as a tramp material or impurity in a batch material included with a glass batch to provide another component. The glass compositions, in some embodiments, can comprise a combination of rare earth oxides (e.g., one or more of various rare earth oxides). In some embodiments, $RE_2O_3$ may comprise at least one of $La_2O_3$, $Y_2O_3$, $Sc_2O_3$, and $Nd_2O_3$. In some embodiments, $RE_2O_3$ may be $Y_2O_3$. In some embodiments, the $Y_2O_3$ content can be about 1 weight percent or less. In some cases, $RE_2O_3$ may be present in an amount greater than 0 weight percent and less than 1.5 weight percent. In some cases, the composition may be substantially free of $RE_2O_3$.

Not intending to be bound by theory, the inclusion of $Y_2O_3$ in glass compositions may have a desirable impact on glass softening temperature and glass transition temperature as well as on modulus, tensile strength, elongation, coefficient of thermal expansion, and other properties of glass fibers formed from the compositions.

In some embodiments, the glass composition suitable for fiber forming as described herein may comprise ($Li_2O$+$MgO$+$Al_2O_3$) from about 22 up to 23 weight percent. In some embodiments, the glass composition suitable for fiber forming may comprise ($Li_2O$+$MgO$+$Al_2O_3$) from about 22 up to 24 weight percent. For example, the composition may include ($Li_2O$+$MgO$+$Al_2O_3$) in an amount of about 22 wt. %, 22.1.1 wt. %, 22.2 wt. %, 22.3 wt. %, 22.4 wt. %, 22.5 wt. %, 22.6 wt. %, 22.7 wt. %, 22.8 wt. %, 22.9 wt. %, 23 wt. %, 23.1 wt. %, 23.2 wt. %, 23.3 wt. %, 23.4 wt. %, 23.5 wt. %, 23.6 wt. %, 23.7 wt. %, 23.8 wt. %, 23.9, or 24 wt %.

In some embodiments, the glass composition suitable for fiber forming as described herein may comprise a ratio of CaO to MgO ("CaO/MgO") from about 1.6 to about 2.8 (e.g., 1.7 to 2.0). For example, the composition may include CaO/MgO in an amount of about 1.6, 1.65, 1.7, 1.75, 1.8, 1.85, 1.9, 1.95, 2.0, 2.15, 2.2, 2.25, 2.3, 2.35, 2.4, 2.45, 2.5, 2.55, 2.6, 2.65, 2.7, 2.75, or 2.8.

In some embodiments, the glass composition suitable for fiber forming as described herein may comprise a ratio of $SiO_2$ to $Al_2O_3$ ("$SiO_2$/$Al_2O_3$") from about 3.5 to about 4.6 (e.g., from about 3.9 to about 4.3, from about 4 to about 4.5, from greater than 4 to 4.5). For example, the composition may include $SiO_2$/$Al_2O_3$ in an amount of about 3.5, 3.55, 3.6, 3.65, 3.7, 3.75, 3.8, 3.85, 3.9, 3.95, 4, 4.05, 4.1, 4.15, 4.2, 4.25, 4.3, 4.35, 4.4, 4.45, 4.5, 4.55, or 4.6. In some embodiments, the $SiO_2$/$Al_2O_3$ may be greater than 4.

In some embodiments, the glass composition suitable for fiber forming as described herein may comprise a ratio of $Al_2O_3$ to ($Al_2O_3$+CaO+MgO) ("$Al_2O_3$/($Al_2O_3$+CaO+MgO)") from about 0.33 to about 0.47 (e.g., from about 0.35 to about 0.41, from about 0.35 to less than 0.40). For example, the composition may include $Al_2O_3$/($Al_2O_3$+CaO+MgO) in an amount of about 0.33, 0.34, 0.35, 0.36, 0.37, 0.38, 0.39, 0.40, 0.41, 0.42, 0.43, 0.44, 0.45, 0.46, or 0.47. In some embodiments, the $Al_2O_3$/($Al_2O_3$+CaO+MgO) may be less than 0.40. In other embodiments, the $Al_2O_3$/($Al_2O_3$+MgO+CaO) ratio may range from 0.37 to 0.42.

In some embodiments, the glass composition may comprise up to 0.2 weight percent $Na_2O$. In some cases, the composition may be substantially free of $Na_2O$. In certain embodiments, the glass composition may comprise up to 0.2 weight percent $K_2O$. In some cases, the composition may be substantially free of $K_2O$. In some embodiments, the glass composition may be substantially free of at least one of Zn, F, B, or Sr.

In some embodiments, the glass composition suitable for fiber forming may comprise: $SiO_2$ from about 60 to about 63 weight percent; $Al_2O_3$ from about 14 to about 16 weight percent; CaO from about 14 to about 16 weight percent; MgO from about 6 to about 8.5 weight percent; $Fe_2O_3$ less than 1 weight percent; and $TiO_2$ less than 1 weight percent. In some embodiments, the composition may be substantially free of $Li_2O$. In some embodiments, the ($Li_2O+MgO+Al_2O_3$) content may ranges from about 22 up to 24 weight percent.

In some cases, the glass composition suitable for fiber forming may comprise: $SiO_2$ from about 60 to about 63 weight percent; $Al_2O_3$ from about 14 to about 16 weight percent; CaO from about 14 to about 16 weight percent; MgO from about 6 to about 8.5 weight percent; $Fe_2O_3$ less than 1 weight percent; $TiO_2$ less than 1 weight percent; and $RE_2O_3$ present in an amount greater than 0 weight percent and less than 1 weight percent. In some embodiments, the composition may be substantially free of $Li_2O$.

In certain embodiments, a glass composition suitable for fiber forming may comprise $SiO_2$ from about 59 to about 63 weight percent, $Al_2O_3$ from about 13.7 to about 16 weight percent, CaO from about 14 to about 16.5 weight percent, MgO from about 6 to about 8.5 weight percent, $Fe_2O_3$ less than 1 weight percent, $TiO_2$ less than 1 weight percent, and rare earth oxide, $RE_2O_3$ in an amount greater than 0 weight percent and less than 1.5 weight percent, where the composition is substantially free of $Li_2O$.

In certain embodiments, the glass composition suitable for fiber forming may comprise: $SiO_2$ from about 60 to about 63 weight percent; $Al_2O_3$ from about 14 to about 16 weight percent; CaO from about 14 to about 16 weight percent; MgO from about 6 to about 8.5 weight percent; $Fe_2O_3$ less than 1 weight percent; $TiO_2$ less than 1 weight percent; $Li_2O$ less than 0.5 weight percent; and $RE_2O_3$ present in an amount greater than 0 weight percent and less than 1 weight percent. In some embodiments, the ($Li_2O+MgO+Al_2O_3$) content may range from about 22 up to 24 weight percent.

In some embodiments, the glass composition suitable for fiber forming may comprise: $SiO_2$ from about 60 to about 63 weight percent; $Al_2O_3$ from about 14 to about 16 weight percent; CaO from about 14 to about 16 weight percent; MgO from about 6 to about 8.5 weight percent; $Fe_2O_3$ less than 1 weight percent; $TiO_2$ less than 1 weight percent; and $Li_2O$ present in an amount greater than 0 weight percent and less than 0.5 weight percent. In some embodiments, the ($Li_2O+MgO+Al_2O_3$) content ranges from about 22 up to 23 weight percent.

It should be understood that any component of a glass composition described as being present in amount from about 0 weight percent to another weight percent is not necessarily required in all embodiments. Such components may be optional in some embodiments. Likewise, in some embodiments, glass compositions can be substantially free of some components; any amount of the component present in the glass composition would result from the component being present as a trace impurity in a batch material. A component present as a trace impurity is not intentionally added to the glass composition, but rather, it may be present in a herein described glass composition by virtue of its presence as an impurity in a starting material added to the glass composition. Generally, a trace impurity is present in the glass composition in an amount no greater than about 0.1 weight percent, although some trace impurities may be present in the glass composition in an amount up to about 0.5 weight percent.

In some embodiments, the glass compositions of the present invention may be fiberizable. In some embodiments, glass compositions may have forming temperatures ($T_F$) desirable for use in commercial fiber glass manufacturing operations. As used herein, the term "forming temperature" or $T_F$, means the temperature at which the glass composition has a viscosity of 1000 poise (or "log 3 temperature"). In some embodiments, the glass compositions may have a forming temperature ($T_F$) less than 1350° C. (e.g., less than 1320° C., less than 1300). By way of example, rounded to the nearest 5° C., the $T_F$ may be about 1200° C., 1205° C., 1210° C., 1215° C., 1220° C., 1225° C., 1230° C., 1235° C., 1240° C., 1245° C., 1250° C., 1255° C., 1260° C., 1265° C., 1270° C., 1275° C., 1280° C., 1285° C., 1290° C., 1295° C., 1300° C., 1305° C., 1310° C., 1315° C., 1320° C., 1325° C., 1330° C., 1335° C., 1340° C., 1345° C., or up to 1350° C.

In some embodiments, the glass compositions may have a liquidus temperature ($T_L$) of less than 1250° C. (e.g., less than 1220° C., less than 1200). For example, rounded to the nearest 5° C., the $T_L$ may be about 1120° C., 1125° C., 1130° C., 1135° C., 1140° C., 1145° C., 1150° C., 1155° C., 1160° C., 1165° C., 1170° C., 1175° C., 1180° C., 1185° C., 1190° C., 1195° C., 1200° C., 1205° C., 1210° C., 1215° C., 1220° C., 1225° C., 1230° C., 1235° C., 1240° C., 1245° C., or up to 1250° C.

In some embodiments, the difference between the forming temperature ($T_F$) and the liquidus temperature ($T_L$) of a glass composition may be desirable for commercial fiber glass manufacturing operations. For example, in some embodiments of glass compositions, the difference between the $T_F$ and the $T_F$ ("Delta T") may be greater than about 60° C. (e.g., greater than 80° C., greater than 100). For example, the Delta T may be about 62° C., 64° C., 66° C., 68° C., 70° C., 72° C., 74° C., 76° C., 78° C., 80° C., 82° C., 84° C., 86° C., 88° C., 90° C., 92° C., 94° C., 96° C., 98° C., 100° C., 105° C., 110° C., 115° C., or 120° C.

In some embodiments, the glass compositions may have a melt temperature ($T_M$) of less than 1530° C. (e.g., less than 1510° C., less than 1480° C.). For example, the $T_M$ may be about 1465° C., 1468° C., 1470° C., 1472° C., 1474° C., 1476° C., 1478° C., 1480° C., 1482° C., 1484° C., 1486° C., 1488° C., 1490° C., 1492° C., 1494° C., 1496° C., 1498° C., 1500° C., 1502° C., 1504° C., 1506° C., 1508° C., 1510° C., 1512° C., 1514° C., 1516° C., 1518° C., 1520° C., 1522° C., 1524° C., 1526° C., 1528° C., or 1530° C.

In some embodiments, glass fibers may be formed from the glass compositions described herein. Optionally, the glass fibers may be arranged into a fabric. In some embodiments, glass fibers may be provided in other forms including, for example and without limitation, as continuous strands, chopped strands (dry or wet), yarns, rovings, prepregs, etc. Various embodiments of the glass compositions (and any fibers formed therefrom) may be used in a variety of applications. In some embodiments, the fibers may be fiber glass strands, while other embodiments may be yarns comprising fiber glass strands. Some embodiments of yarns may be particularly suitable for weaving applications. In some embodiments, the fibers may be glass fiber fabrics. Some embodiments of fiber glass fabrics of the present invention are particularly suitable for use in reinforcement applications, especially reinforcement applications in which high modulus, high strength, and/or high elongation are important.

Some embodiments of the present invention may relate to composites that incorporate fiber glass strands, fiber glass yarns, and fiber glass fabrics, such as fiber reinforced polymer composites. Some composites may be particularly suitable for use in reinforcement applications, especially reinforcement applications in which high modulus, high strength, and/or high elongation are important, such as wind energy (e.g., windmill blades), automotive applications, safety/security applications (e.g., ballistics armor or armor panels), aerospace or aviation applications (e.g., interior floors of planes), high pressure vessels or tanks, missile casings, and others.

Some embodiments of the present invention relate to composites suitable for use in wind energy applications. Composites of the present invention can be suitable for use in wind turbine blades, particularly long wind turbine blades that are lighter weight but still strong compared to other long wind turbine blades. Lower weight and increased stability in wind energy blades are key considerations for selection of composite materials. The design of wind energy blades has changed over time to pursue longer blades to harvest more energy. Some blades may be 82 meters in length and benefit from improved fiber composites. A stronger glass fiber composite such as those disclosed herein may be useful to achieve a larger wind blade size while providing the strength and weight needed to stay within the load design of windmill. Lighter and stronger materials like the present invention may provide an increase in energy yield and result in improved operating costs, reduced installation costs, ease of transportation, and improved safety.

Still other embodiments of the present invention may relate to automotive composites. Some embodiments of the present invention may relate to aerospace composites. Other embodiments of the present application may relate to aviation composites. Some embodiments of the present invention relate to composites for safety/security applications such as armor panels. Other embodiments of the present invention may relate to composites for high pressure vessels or storage tanks. Some embodiments of the present invention may relate to composites for missile casings. Other embodiments of the present invention may relate to composites for use in high temperature thermal insulation applications. Some embodiments of the present invention may relate to printed circuit boards where lower coefficients of thermal expansion are particularly desirable such as substrates for chip packaging. Some embodiments of the present invention may relate to prepreg. Some embodiments of the present invention may relate to long fiber reinforced thermoplastics (LFT) for various automobile parts. Some embodiments of the present invention may relate to pipes or tanks for chemical transportation and chemical storage. Some embodiments of the present invention may relate to nonwoven, texturized fibers for thermal and sonic management applications, such as muffler for motorbikes, vehicles, and trucks. Some embodiments of the present invention may relate to electrical insulating rods or cables. Some embodiments of the present invention may relate to composite rebar to replace steel rebar for road infrastructures, bridges, and buildings.

Some embodiments of the present invention relate to fiber glass strands. In some embodiments, a fiber glass strand of the present invention comprises a plurality of glass fibers. In some embodiments, a plurality of glass fibers may be formed from the glass composition comprising: $SiO_2$ from about 60 to about 63 weight percent; $Al_2O_3$ from about 14 to about 16 weight percent; CaO from about 14 to about 16 weight percent; MgO from about 6 to about 8.5 weight percent; $Fe_2O_3$ less than 1 weight percent; and $TiO_2$ less than 1 weight percent. In some embodiments, the composition may be substantially free of $Li_2O$. In some embodiments, the ($Li_2O+MgO+Al_2O_3$) content of the composition may range from about 22 up to 24 weight percent. In some embodiments, the a ratio of CaO to MgO (CaO/MgO) of the composition may range from about 1.7 to about 2.0. In some cases, the composition may be substantially free of $F_2$. In some cases, the composition may further comprise up to 0.2 weight percent $Na_2O$. In some cases, the composition may further comprise up to 0.2 weight percent $K_2O$.

In some embodiments, a plurality of glass fibers may be formed from the glass composition comprising: $SiO_2$ from about 59 to about 63 weight percent; $Al_2O_3$ from about 13.7 to about 16 weight percent; CaO from about 14 to about 16.5 weight percent; MgO from about 6 to about 8.5 weight percent; $Fe_2O_3$ less than 1 weight percent; $TiO_2$ less than 1 weight percent; and $RE_2O_3$ present in an amount greater than 0 weight percent and less than 1.5 weight percent. In some embodiments, the composition may be substantially free of $Li_2O$. In some embodiments, the ($Li_2O+MgO+Al_2O_3$) content of the composition may range from about 22 up to 24 weight percent. In some embodiments, the a ratio of CaO to MgO (CaO/MgO) of the composition may range from about 1.6 to about 2.8. In some cases, the composition may be substantially free of $F_2$. In some cases, the composition may further comprise up to 0.2 weight percent $Na_2O$. In some cases, the composition may further comprise up to 0.2 weight percent $K_2O$.

In some embodiments, a glass fiber or a plurality of glass fibers may be formed from the glass composition comprising: $SiO_2$ from about 60 to about 63 weight percent; $Al_2O_3$ from about 14 to about 16 weight percent; CaO from about 14 to about 16 weight percent; MgO from about 6 to about 8.5 weight percent; $Fe_2O_3$ less than 1 weight percent; $TiO_2$ less than 1 weight percent; $Li_2O$ less than 0.5 weight percent; and $RE_2O_3$ is present in an amount greater than 0 weight percent and less than 1 weight percent. In some embodiments, the ($Li_2O+MgO+Al_2O_3$) content of the composition may range from about 22 up to 24 weight percent. In some embodiments, the a ratio of CaO to MgO (CaO/MgO) of the composition may range from about 1.7 to about 2.0. In some cases, the composition may be substantially free of $F_2$. In some cases, the composition may further comprise up to 0.2 weight percent $Na_2O$. In some cases, the composition may further comprise up to 0.2 weight percent $K_2O$.

In some embodiments, a glass fiber or a plurality of glass fibers may be formed from the glass composition comprising: $SiO_2$ from about 60 to about 63 weight percent; $Al_2O_3$ from about 14 to about 16 weight percent; CaO from about 14 to about 16 weight percent; MgO from about 6 to about 8.5 weight percent; $Fe_2O_3$ less than 1 weight percent; $TiO_2$ less than 1 weight percent; and $Li_2O$ present in an amount greater than 0 weight percent and less than 0.5 weight percent. In some embodiments, the ($Li_2O+MgO+Al_2O_3$) content may range from about 22 up to 23 weight percent. In some embodiments, the a ratio of CaO to MgO (CaO/MgO) of the composition may range from about 1.7 to about 2.0. In some cases, the composition may be substantially free of $F_2$. In some cases, the composition may further comprise up to 0.2 weight percent $Na_2O$. In some cases, the composition may further comprise up to 0.2 weight percent $K_2O$.

In some embodiments, a glass fiber or a plurality of glass fibers may be formed from the glass composition comprising: $SiO_2$ from about 60 to about 63 weight percent; $Al_2O_3$ from about 14 to about 16 weight percent; CaO from about 14 to about 16 weight percent; MgO from about 6 to about 8.5 weight percent; $Fe_2O_3$ less than 1 weight percent; $TiO_2$ less than 1 weight percent; and $Li_2O$ present in an amount greater than 0 weight percent and less than 0.5 weight percent. In some embodiments, the ($Li_2O+MgO+Al_2O_3$) content may range from about 22 up to 24 weight percent. In some embodiments, the Young's modulus may be greater than 85 GPa. In some embodiments, the Young's modulus may be greater than 88 GPa. In some embodiments, the a ratio of CaO to MgO (CaO/MgO) of the composition may range from about 1.7 to about 2.0. In some cases, the composition may be substantially free of $F_2$. In some cases, the composition may further comprise up to 0.2 weight percent $Na_2O$. In some cases, the composition may further comprise up to 0.2 weight percent $K_2O$.

In some embodiments, a glass fiber or a plurality of glass fibers of the present invention may exhibit desirable mechanical and other properties. Glass fibers of the present invention, in some embodiments, can exhibit one or more improved mechanical properties relative to glass fibers formed from E-glass. In some embodiments, glass fibers of the present invention can provide one or more improved properties relative to glass fibers formed from R-glass and/or S-glass. Examples of desirable properties exhibited by some embodiments of glass fibers of the present invention include, without limitation, tensile strength, Young's modulus, coefficient of thermal expansion, softening point, elongation, and dielectric constant.

In some embodiments, a glass fiber or a plurality of glass fibers may be formed from the glass composition described herein. In certain embodiments, the plurality of glass fibers may have desirable Young's modulus (E) values. In some cases, the plurality of glass fibers may have a Young's modulus greater than about 85 GPa (e.g., greater than 87 GPa, greater than 88 GPa). For example, the Young's modulus may be about 85 GPa, 85.1 GPa, 85.2 GPa, 85.3 GPa, 85.4 GPa, 85.5 GPa, 85.6 GPa, 85.7 GPa, 85.8 GPa, 85.9 GPa, 86 GPa, 86.1 GPa, 86.2 GPa, 86.3 GPa, 86.4 GPa, 86.5 GPa, 85.6 GPa, 86.7 GPa, 86.8 GPa, 86.9 GPa, 87 GPa, 87.1 GPa, 87.2 GPa, 87.3 GPa, 87.4 GPa, 87.5 GPa, 87.6 GPa, 87.7 GPa, 87.8 GPa, 87.9 GPa, 88 GPa, 88.1 GPa, 88.2 GPa, 88.3 GPa, 88.4 GPa, 88.5 GPa, 88.6 GPa, 88.7 GPa, 88.8 GPa, 88.9 GPa, 89 GPa, 89.1 GPa, 89.2 GPa, 89.3 GPa, 89.4 GPa, or 89.5 GPa. In some embodiments, the plurality of glass fibers may have a Young's modulus greater than about 90 GPa. In certain embodiments, the plurality of glass fibers may have a Young's modulus of up to 95 GPa.

In certain embodiments, the glass fiber or plurality of glass fibers may have desirable density values. In some cases, the plurality of glass fibers may have a density less than about 2.7 $g/cm^3$ (e.g., less than 2.6 GPa, greater than 2.55 GPa). For example, the density may be about 2.55 $g/cm^3$, 2.56 $g/cm^3$, 2.57 $g/cm^3$, 2.58 $g/cm^3$, 2.59 $g/cm^3$, 2.6 $g/cm^3$, 2.61 $g/cm^3$, 2.62 $g/cm^3$, 2.63 $g/cm^3$, 2.64 $g/cm^3$, 2.65 $g/cm^3$, 2.66 $g/cm^3$, 2.67 $g/cm^3$, 2.68 $g/cm^3$, 2.69 $g/cm^3$, or 2.7$g/cm^3$.

Fiber glass strands can comprise glass fibers of various diameters, depending on the desired application. In some embodiments, a fiber glass strand of the present invention may comprise at least one glass fiber having a diameter between about 5 and about 18 μm. In other embodiments, the at least one glass fiber has a diameter between about 5 and about 10 μm. In some embodiments, fiber glass strands of the present invention can be formed into rovings. Rovings may comprise assembled, multi-end, or single-end direct draw rovings. Rovings comprising fiber glass strands of the present invention can comprise direct draw single-end rovings having various diameters and densities, depending on the desired application. In some embodiments, a roving comprising fiber glass strands of the present invention exhibits a density up to about 112 yards/pound. Some embodiments of the present invention relate to yarns comprising at least one fiber glass strand as disclosed herein.

In some embodiments, a fiber glass strand may comprise the plurality of glass fibers of any one of the glass compositions described herein. For example, in some embodiments, a fiber glass strand may comprise a plurality of glass fibers formed from the glass composition comprising: $SiO_2$ from about 60 to about 63 weight percent; $Al_2O_3$ from about 14 to about 16 weight percent; CaO from about 14 to about 16 weight percent; MgO from about 6 to about 8.5 weight percent; $Fe_2O_3$ less than 1 weight percent; and $TiO_2$ less than 1 weight percent. In some embodiments, the composition may be substantially free of $Li_2O$. In some cases, the composition may further comprise $Li_2O$ less than 0.5 weight percent. In some cases, $Li_2O$ may be present in an amount greater than 0 weight percent and less than 0.5 weight percent. In some embodiments, the ($Li_2O+MgO+Al_2O_3$) content of the composition may range from about 22 up to 24 weight percent. In some embodiments, the a ratio of CaO to MgO (CaO/MgO) of the composition may range from about 1.7 to about 2.0. In some cases, the composition may be substantially free of $F_2$. In some cases, the composition may further comprise up to 0.2 weight percent $Na_2O$. In some cases, the composition may further comprise up to 0.2 weight percent $K_2O$. In some cases, $RE_2O_3$ may be present in the composition in an amount greater than 0 weight percent and less than 1 weight percent.

In other embodiments, a yarn of the present invention can comprise at least one fiber glass strand comprising one of the other glass compositions disclosed herein as part of the present invention.

In some embodiments, a yarn of the present invention may comprise at least one fiber glass strand as disclosed herein, wherein the at least one fiber glass strand is at least partially coated with a sizing composition. In some embodiments, the sizing composition may be compatible with a thermosetting polymeric resin. In other embodiments, the sizing composition can comprise a starch-oil sizing composition.

Yarns can have various linear mass densities, depending on the desired application. In some embodiments, a yarn of the present invention may have a linear mass density from about 5,000 yards/pound to about 10,000 yards/pound.

Yarns can have various twist levels and directions, depending on the desired application. In some embodiments, a yarn of the present invention may have a twist in the z direction of about 0.5 to about 2 turns per inch. In other embodiments, a yarn of the present invention may have a twist in the z direction of about 0.7 turns per inch.

Yarns can be made from one or more strands that are twisted together and/or plied, depending on the desired application. Yarns can be made from one or more strands that are twisted together but not plied; such yarns are known as "singles." Yarns of the present invention can be made from one or more strands that are twisted together but not plied. In some embodiments, yarns of the present invention may comprise 1-4 strands twisted together. In other embodiments, yarns of the present invention may comprise 1 twisted strand.

In some embodiments, a fiber glass strand may comprise the plurality of glass fibers of any one of the glass compositions described herein. For example, in some embodiments, a fiber glass strand may comprise a plurality of glass fibers formed from the glass composition comprising: $SiO_2$ from about 59 to about 63 weight percent; $Al_2O_3$ from about 13.7 to about 16 weight percent; CaO from about 14 to about 16.5 weight percent; MgO from about 6 to about 8.5 weight percent; $Fe_2O_3$ less than 1 weight percent; and $TiO_2$ less than 1 weight percent. In some embodiments, the composition may be substantially free of $Li_2O$. In some cases, the composition may further comprise $Li_2O$ less than 0.5 weight percent. In some cases, $Li_2O$ may be present in an amount greater than 0 weight percent and less than 0.5 weight percent. In some embodiments, the ($Li_2O+MgO+Al_2O_3$) content of the composition may range from about 22 up to 24 weight percent. In some embodiments, the a ratio of CaO to MgO (CaO/MgO) of the composition may range from about 1.6 to about 2.8. In some cases, the composition may be substantially free of $F_2$. In some cases, the composition may further comprise up to 0.2 weight percent $Na_2O$. In some cases, the composition may further comprise up to 0.2 weight percent $K_2O$. In some cases, $RE_2O_3$ may be present in the composition in an amount greater than 0 weight percent and less than 1.5 weight percent.

In some embodiments, a roving may comprise the plurality of glass fibers of any one of the glass compositions described herein. For example, in some embodiments, a roving may comprise a plurality of glass fibers formed from the glass composition comprising: $SiO_2$ from about 60 to about 63 weight percent; $Al_2O_3$ from about 14 to about 16 weight percent; CaO from about 14 to about 16 weight percent; MgO from about 6 to about 8.5 weight percent; $Fe_2O_3$ less than 1 weight percent; and $TiO_2$ less than 1 weight percent. In some embodiments, the composition may be substantially free of $Li_2O$. In some cases, the composition may further comprise $Li_2O$ less than 0.5 weight percent. In some cases, $Li_2O$ may be present in an amount greater than 0 weight percent and less than 0.5 weight percent. In some embodiments, the ($Li_2O+MgO+Al_2O_3$) content of the composition may range from about 22 up to 24 weight percent. In some embodiments, the a ratio of CaO to MgO (CaO/MgO) of the composition may range from about 1.7 to about 2.0. In some cases, the composition may be substantially free of $F_2$. In some cases, the composition may further comprise up to 0.2 weight percent $Na_2O$. In some cases, the composition may further comprise up to 0.2 weight percent $K_2O$. In some cases, $RE_2O_3$ may be present in the composition in an amount greater than 0 weight percent and less than 1 weight percent.

In some embodiments, a yarn may comprise the plurality of glass fibers of any one of the glass compositions described herein. For example, in some embodiments, a yarn may comprise a plurality of glass fibers formed from the glass composition comprising: $SiO_2$ from about 60 to about 63 weight percent; $Al_2O_3$ from about 14 to about 16 weight percent; CaO from about 14 to about 16 weight percent; MgO from about 6 to about 8.5 weight percent; $Fe_2O_3$ less than 1 weight percent; and $TiO_2$ less than 1 weight percent. In some embodiments, the composition may be substantially free of $Li_2O$. In some cases, the composition may further comprise $Li_2O$ less than 0.5 weight percent. In some cases, $Li_2O$ may be present in an amount greater than 0 weight percent and less than 0.5 weight percent. In some embodiments, the ($Li_2O+MgO+Al_2O_3$) content of the composition may range from about 22 up to 24 weight percent. In some embodiments, the a ratio of CaO to MgO (CaO/MgO) of the composition may range from about 1.7 to about 2.0. In some cases, the composition may be substantially free of $F_2$. In some cases, the composition may further comprise up to 0.2 weight percent $Na_2O$. In some cases, the composition may further comprise up to 0.2 weight percent $K_2O$. In some cases, $RE_2O_3$ may be present in the composition in an amount greater than 0 weight percent and less than 1 weight percent.

Some embodiments of the present invention relate to fabrics comprising at least one fiber glass strand as disclosed herein. In some embodiments, the fabric may be woven. In other embodiments, the fabric may be non-woven. In some embodiments, a fabric may comprise the plurality of glass fibers of any one of the glass compositions described herein. For example, in some embodiments, a fabric may comprise a plurality of glass fibers formed from the glass composition comprising: $SiO_2$ from about 60 to about 63 weight percent; $Al_2O_3$ from about 14 to about 16 weight percent; CaO from about 14 to about 16 weight percent; MgO from about 6 to about 8.5 weight percent; $Fe_2O_3$ less than 1 weight percent; and $TiO_2$ less than 1 weight percent. In some embodiments, the composition may be substantially free of $Li_2O$. In some cases, the composition may further comprise $Li_2O$ less than 0.5 weight percent. In some cases, $Li_2O$ may be present in an amount greater than 0 weight percent and less than 0.5 weight percent. In some embodiments, the ($Li_2O+MgO+Al_2O_3$) content of the composition may range from about 22 up to 24 weight percent. In some embodiments, the a ratio of CaO to MgO (CaO/MgO) of the composition may range from about 1.7 to about 2.0. In some cases, the composition may be substantially free of $F_2$. In some cases, the composition may further comprise up to 0.2 weight percent $Na_2O$. In some cases, the composition may further comprise up to 0.2 weight percent $K_2O$. In some cases, $RE_2O_3$ may be present in the composition in an amount greater than 0 weight percent and less than 1 weight percent.

In some embodiments of the present invention comprising a fabric, the glass fiber fabric may be a fabric woven in accordance with industrial fabric style no. 7781. In other embodiments, the fabric comprises a plain weave fabric, a twill fabric, a crowfoot fabric, a satin weave fabric, a stitch bonded fabric (also known as a non-crimp fabric), or a "three-dimensional" woven fabric.

Some embodiments of the present invention relate to composites. In some embodiments, a polymeric composite may comprise a polymeric material and a plurality of glass fibers formed from a glass composition described herein. For example, in some embodiments, a polymeric composite may comprise a polymeric material and a plurality of glass fibers formed from the glass composition comprising: $SiO_2$ from about 59 to about 63 weight percent; $Al_2O_3$ from about 13.7 to about 16 weight percent; CaO from about 14 to about 16.5 weight percent; MgO from about 6 to about 8.5 weight percent; $Fe_2O_3$ less than 1 weight percent; and $TiO_2$ less than 1 weight percent. In some embodiments, the composition may be substantially free of $Li_2O$. In some cases, the composition may further comprise $Li_2O$ less than 0.5 weight percent. In some cases, $Li_2O$ may be present in an amount greater than 0 weight percent and less than 0.5 weight percent. In some embodiments, the ($Li_2O+MgO+Al_2O_3$) content of the composition may range from about 22 up to 24 weight percent. In some embodiments, the a ratio of CaO to MgO (CaO/MgO) of the composition may range from about 1.7 to about 2.0. In some cases, the composition may be substantially free of $F_2$. In some cases, the composition may further comprise up to 0.2 weight percent $Na_2O$. In some cases, the composition may further comprise up to 0.2 weight percent $K_2O$. In some cases, $RE_2O_3$ may be present in the composition in an amount greater than 0 weight percent and less than 1.5 weight percent. In some embodiments, the plurality of glass fibers may be in the form of a non-woven fabric. In some embodiments, the plurality of glass fibers may be in the form of a woven fabric. In some embodiments, the polymeric material may comprise a thermoplastic polymer. In some embodiments, the polymeric material may comprise a thermosetting polymer.

In other embodiments, a composite of the present invention may comprise a polymeric resin and a plurality of glass fibers disposed in the polymeric resin, wherein at least one of the plurality of glass fibers was formed from one of the other glass compositions disclosed herein as part of the present invention. In some embodiments, a composite may comprise a polymeric resin and at least one fiber glass strand as disclosed herein disposed in the polymeric resin. In some embodiments, a composite may comprise a polymeric resin and at least a portion of a roving comprising at least one fiber glass strand as disclosed herein disposed in the polymeric resin. In other embodiments, a composite may comprise a polymeric resin and at least one yarn as disclosed herein disposed in the polymeric resin. In still other embodiments, a composite may comprise a polymeric resin and at least one fabric as disclosed herein disposed in the polymeric resin. In some embodiments, a composite may comprise at least one fill yarn comprising at least one fiber glass strand as disclosed herein and at least one warp yarn comprising at least one fiber glass strand as disclosed herein.

Composites of the present invention can comprise various polymeric resins, depending on the desired properties and applications. In some embodiments, the polymeric resin may comprise an epoxy resin. In other embodiments, the polymeric resin may comprise polyethylene, polypropylene, polyamide, polyimide, polybutylene terephthalate, polycarbonate, thermoplastic polyurethane, phenolic, polyester, vinyl ester, polydicyclopentadiene, polyphenylene sulfide, polyether ether ketone, cyanate esters, bis-maleimides, or thermoset polyurethane resins.

In certain embodiments, an article of manufacture may comprise a plurality of glass fibers formed from the glass composition of any one of the compositions described herein. For example, in some embodiments, an article of manufacture may comprise a plurality of glass fibers formed from the glass composition comprising: $SiO_2$ from about 60 to about 63 weight percent; $Al_2O_3$ from about 14 to about 16 weight percent; CaO from about 14 to about 16 weight percent; MgO from about 6 to about 8.5 weight percent; $Fe_2O_3$ less than 1 weight percent; and $TiO_2$ less than 1 weight percent. In some embodiments, the composition may be substantially free of $Li_2O$. In some cases, the composition may further comprise $Li_2O$ less than 0.5 weight percent. In some cases, $Li_2O$ may be present in an amount greater than 0 weight percent and less than 0.5 weight percent. In some embodiments, the ($Li_2O+MgO+Al_2O_3$) content of the composition may range from about 22 up to 24 weight percent. In some embodiments, the a ratio of CaO to MgO (CaO/MgO) of the composition may range from about 1.7 to about 2.0. In some cases, the composition may be substantially free of $F_2$. In some cases, the composition may further comprise up to 0.2 weight percent $Na_2O$. In some cases, the composition may further comprise up to 0.2 weight percent $K_2O$. In some cases, $RE_2O_3$ may be present in the composition in an amount greater than 0 weight percent and less than 1 weight percent. In some embodiments, the plurality of glass fibers may be in the form of a non-woven fabric. In some embodiments, the plurality of glass fibers may be in the form of a woven fabric.

In other embodiments, an article of manufacture may comprise a polymeric material and a plurality of glass fibers formed from the glass composition comprising: $SiO_2$ from about 59 to about 63 weight percent; $Al_2O_3$ from about 13.7 to about 16.5 weight percent; CaO from about 14 to about 16.5 weight percent; MgO from about 6 to about 8.5 weight percent; $Fe_2O_3$ less than 1 weight percent; and $TiO_2$ less than 1 weight percent. In some embodiments, the composition may be substantially free of $Li_2O$. In some cases, the composition may further comprise $Li_2O$ less than 0.5 weight percent. In some cases, $Li_2O$ may be present in an amount greater than 0 weight percent and less than 0.5 weight percent. In some embodiments, the ($Li_2O+MgO+Al_2O_3$) content of the composition may range from about 22 up to 24 weight percent. In some embodiments, the a ratio of CaO to MgO (CaO/MgO) of the composition may range from about 1.7 to about 2.0. In some cases, the composition may be substantially free of $F_2$. In some cases, the composition may further comprise up to 0.2 weight percent $Na_2O$. In some cases, the composition may further comprise up to 0.2 weight percent $K_2O$. In some cases, $RE_2O_3$ may be present in the composition in an amount greater than 0 weight percent and less than 1.5 weight percent. In some embodiments, the plurality of glass fibers may be in the form of a non-woven fabric. In some embodiments, the plurality of glass fibers may be in the form of a woven fabric. In some embodiments, the polymeric material may comprise a thermoplastic polymer. In some embodiments, the polymeric material may comprise a thermosetting polymer.

Some embodiments of the present invention relate to aerospace composites. In some embodiments, an aerospace composite may exhibit properties desirable for use in aerospace applications, such as high strength, high elongation, high modulus, and/or low density. In some embodiments, an aerospace composite may comprise a plurality of glass fibers from a glass composition described herein. For example, in some embodiments, an aerospace composite may comprise a polymeric material and a plurality of glass fibers formed from the glass composition comprising: $SiO_2$ from about 60 to about 63 weight percent; $Al_2O_3$ from about 14 to about 16 weight percent; CaO from about 14 to about 16.5 weight percent; MgO from about 6 to about 8.5 weight percent; $Fe_2O_3$ less than 1 weight percent; and $TiO_2$ less than 1 weight percent. In some embodiments, the composition may be substantially free of $Li_2O$. In some cases, the composition may further comprise $Li_2O$ less than 0.5 weight percent. In some cases, $Li_2O$ may be present in an amount greater than 0 weight percent and less than 0.5 weight percent. In some embodiments, the ($Li_2O+MgO+Al_2O_3$) content of the composition may range from about 22 up to 24 weight percent. In some embodiments, the a ratio of CaO to MgO (CaO/MgO) of the composition may range from about 1.7 to about 2.0. In some cases, the composition may be substantially free of $F_2$. In some cases, the composition may further comprise up to 0.2 weight percent $Na_2O$. In some cases, the composition may further comprise up to 0.2 weight percent $K_2O$. In some cases, $RE_2O_3$ may be present in the composition in an amount greater than 0 weight percent and less than 1 weight percent. In some embodiments, the plurality of glass fibers may be in the form of a non-woven fabric. In some embodiments, the plurality of glass fibers may be in the form of a woven fabric. In some embodiments, the polymeric material may comprise a thermoplastic polymer. In some embodiments, the polymeric material may comprise a thermosetting polymer.

Examples of components in which composites of the present invention might be used may include, but are not limited to, aerospace parts such as floor panels, overhead bins, galleys, seat backs, and other internal compartments that are potentially prone to impact, as well as external components such as helicopter rotor blades; automotive parts such as structural components, bodies, and bumpers; wind energy components such as wind turbine blades; high pressure vessels and/or tanks; safety and/or security applications; high mechanical stress applications; high energy impact applications such as ballistic or blast resistance applications; armor applications production of armor panels; casings for missiles and other explosive delivery devices; applications in the oil and gas industry, other applications related to transportation and infrastructure, applications in alternative energy, high temperature thermal insulation (i.e., thermal shielding) applications (due to higher strength, higher modulus, higher softening temperature and higher glass transition temperature). In some embodiments, a composite may have sheet-like physical dimensions or shape, and may be a panel.

Some embodiments of the present invention relate to prepregs. In some embodiments, a prepreg may comprise a plurality of glass fibers from a glass composition described herein. For example, in some embodiments, a prepreg may comprise a polymeric material and a plurality of glass fibers formed from the glass composition comprising: $SiO_2$ from about 60 to about 63 weight percent; $Al_2O_3$ from about 14 to about 16 weight percent; CaO from about 14 to about 16 weight percent; MgO from about 6 to about 8.5 weight percent; $Fe_2O_3$ less than 1 weight percent; and $TiO_2$ less than 1 weight percent. In some embodiments, the composition may be substantially free of $Li_2O$. In some cases, the composition may further comprise $Li_2O$ less than 0.5 weight percent. In some cases, $Li_2O$ may be present in an amount greater than 0 weight percent and less than 0.5 weight percent. In some embodiments, the ($Li_2O+MgO+Al_2O_3$) content of the composition may range from about 22 up to 24 weight percent.

In some embodiments, the a ratio of CaO to MgO (CaO/MgO) of the composition may range from about 1.7 to about 2.0. In some cases, the composition may be substantially free of $F_2$. In some cases, the composition may further comprise up to 0.2 weight percent $Na_2O$. In some cases, the composition may further comprise up to 0.2 weight percent $K_2O$. In some cases, $RE_2O_3$ may be present in the composition in an amount greater than 0 weight percent and less than 1 weight percent. In some embodiments, the plurality of glass fibers may be in the form of a non-woven fabric. In some embodiments, the plurality of glass fibers may be in the form of a woven fabric. In some embodiments, the polymeric material may comprise a thermoplastic polymer. In some embodiments, the polymeric material may comprise a thermosetting polymer.

While many of the applications for the glass fibers described herein are reinforcement applications, some embodiments of glass fibers may be utilized in electronics applications such as printed circuit boards ("PCB").

More particularly, some embodiments relate to glass fiber reinforcements that have electrical properties that permit enhancing performance of a PCB. For example, some embodiments may have a dielectric constant (Dk) desirable for electronics applications. The dielectric constant of a material (Dk), also known as "permittivity," is a measure of the ability of a material to store electric energy. A material to be used as a capacitor desirably has a relatively high Dk, whereas a material to be used as part of a PCB substrate desirably has a low Dk, particularly for high speed circuits. Dk is the ratio of the charge that would be stored (i.e., the capacitance) of a given material between two metal plates to the amount of charge that would be stored by a void (air or vacuum) between the same two metal plates. As another example, some embodiments may have a coefficient for thermal expansion desirable for electronics applications. Accordingly, some embodiments may be used in a variety of electrical applications including, without limitation, printed circuit boards, precursors to printed circuit boards (e.g., fabrics, laminates, prepregs, etc.). In such embodiments, the printed circuit board or other composite to be used in electrical applications can comprise a polymeric resin and a plurality of glass fibers in contact with the polymeric resin, wherein at least one of the plurality of glass fibers was formed from any of the glass compositions disclosed herein as part of the present invention. The polymeric resin can include any of those known to those of skill in the art for use in printed circuit boards or other electrical applications.

Turning now to methods of manufacturing glass fibers of the present invention and related products, glass fibers of the present invention can be prepared in the conventional manner well known in the art, by blending the raw materials used to supply the specific oxides that form the composition of the fibers. Glass fibers according to the various embodiments of the present invention can be formed using any process known in the art for forming glass fibers, and more desirably, any process known in the art for forming essentially continuous glass fibers. For example, although not limiting herein, the glass fibers according to non-limiting embodiments of the present invention can be formed using direct-melt or indirect-melt fiber forming methods. These methods are well known in the art and further discussion thereof is not believed to be necessary in view of the present disclosure. See, e.g., K. L. Loewenstein, The Manufacturing Technology of Continuous Glass Fibers, 3rd Ed., Elsevier, N.Y., 1993 at pages 47-48 and 117-234.

Following formation of the glass fibers, a primary sizing composition can be applied to the glass fibers using any suitable method known to one of ordinary skill in the art. One skilled in the art may choose one of many commercially available sizing compositions for the glass fibers based upon a number of factors including, for example, performance properties of the sizing compositions, desired flexibility of the resulting fabric, cost, and other factors.

Fiber glass strands of the present invention can be prepared by any suitable method known to one of ordinary skill in the art. Glass fiber fabrics of the present invention can generally be made by any suitable method known to one of ordinary skill in the art, such as but not limited to interweaving weft yarns (also referred to as "fill yarns") into a plurality of warp yarns.

Composites of the present invention can be prepared by any suitable method known to one of ordinary skill in the art, such as, but not limited to, vacuum assisted resin infusion molding, extrusion compounding, compression molding, resin transfer molding, filament winding, prepreg/autoclave curing, and pultrusion. Composites of the present invention can be prepared using such molding techniques as known to those of ordinary skill in the art. In particular, embodiments of composites of the present invention that incorporate woven fiber glass fabrics can be prepared using techniques known to those of skill in the art for preparation of such composites.

Prepregs of the present invention can be prepared by any suitable means known to one of ordinary skill in the art, such as but not limited to passing fiber glass strands, rovings, or fabrics through a resin bath; using a solvent-based resin; or using a resin film.

As noted above, composites of the present invention can comprise a polymeric resin, in some embodiments. A variety of polymeric resins may be used. Polymeric resins that are known to be useful in reinforcement applications can be particularly useful in some embodiments. In some embodiments, the polymeric resin may comprise a thermoset resin. Thermoset resin systems useful in some embodiments of the present invention may include, but are not limited to, epoxy resin systems, phenolic based resins, polyesters, vinyl esters, thermoset polyurethanes, polydicyclopentadiene (pDCPD) resins, cyanate esters, and bis-maleimides. In some embodiments, the polymeric resin can comprise an epoxy resin. In other embodiments, the polymeric resin can comprise a thermoplastic resin. Thermoplastic polymers useful in some embodiments of the present invention include, but are not limited to, polyethylene, polypropylene, polyamides (including Nylon), polybutylene terephthalate, polycarbonate, thermoplastic polyurethanes (TPU), polyphenylene sulfides, and polyether ether keteone (PEEK). Non-limiting examples of commercially available polymeric resins useful in some embodiments of the present invention include EPIKOTE Resin MGS® RIMR 135 epoxy with Epikure MGS RIMH 1366 curing agent (available from Momentive Specialty Chemicals Inc. of Columbus, Ohio), Applied Poleramic MMFCS2 epoxy (available from Applied Poleramic, Inc., Benicia, California), and EP255 modified epoxy (available from Barrday Composite Solutions, Millbury, MA).

The invention will be illustrated through the following series of specific embodiments. However, it will be understood by one of skill in the art that many other embodiments are contemplated by the principles of the invention.

EXAMPLES

Table 1 provides a plurality of fiberizable glass compositions according to various embodiments of the present invention as well as data relating to various properties of such compositions. The glasses in these examples were made by melting mixtures of commercial and reagent grade chemicals (reagent grade chemicals were used only for the rare earth oxides) in powder form in 10% Rh/Pt crucibles at the temperatures between 1500° C. and 1550° C. (2732° F.-2822° F.) for four hours. Each batch was about 1000 grams. After the 4 hour melting period, the molten glass was poured onto a steel plate for quenching. Volatile species, such as alkali oxides from impurities in ingredients used, were not adjusted in the batches for their emission loss because of their low concentrations in the glasses. The compositions in the Examples represent as-batched compositions. Commercial ingredients were used in preparing the glasses. In the batch calculation, special raw material retention factors were considered to calculate the oxides in each glass. The retention factors are based on years of glass batch melting and oxides yield in the glass as measured. Hence, the as-batched compositions illustrated in the examples are considered to be close to the measured compositions.

Melt Properties

Melt viscosity as a function of temperature and liquidus temperature was determined by using ASTM Test Method C965 "Standard Practice for Measuring Viscosity of Glass Above the Softening Point," and C829 "Standard Practices for Measurement of Liquidus Temperature of Glass by the Gradient Furnace Method," respectively.

Table 1 includes measured liquidus temperature ($T_L$), reference temperature of forming ($T_F$) defined by melt viscosity of 1000 Poise for the glass compositions. The difference between the forming temperature and the liquidus temperature (Delta T) is also shown.

Mechanical Properties

Young's modulus was also measured for certain glass compositions in Table 1 using the following technique. Approximately 50 grams of glass cullet having a composition corresponding to the appropriate example Table 1 was re-melted in a 90Pt/10Rh crucible for two hours at a melting temperature defined by 100 Poise. The crucible was subsequently transferred into a vertical tube, electrically heated furnace. The furnace temperature was preset at a fiber pulling temperature close or equal to a 1000 Poise melt viscosity. The glass was equilibrated at the temperature for one hour before fiber drawing. The top of the fiber drawing furnace had a cover with a center hole, above which a water-cooled copper coil was mounted to regulate the fiber cooling. A silica rod was then manually dipped into the melt through the cooling coil, and a fiber about 1-1.5 m long was drawn out and collected. The diameter of the fiber ranged from about 100 µm at one end to about 1000 µm at the other end.

TABLE 1

| Oxide (wt. %) | Ex 1 | Ex 2 | Ex 3 | Ex 4 | Ex 5 |
|---|---|---|---|---|---|
| $SiO_2$ | 60.71 | 61.72 | 62.11 | 60.91 | 60.70 |
| $Al_2O_3$ | 14.21 | 14.26 | 14.65 | 14.24 | 15.49 |
| $Fe_2O_3$ | 0.30 | 0.30 | 0.31 | 0.28 | 0.29 |
| CaO | 15.37 | 14.81 | 14.30 | 15.24 | 14.52 |
| MgO | 8.19 | 8.18 | 7.90 | 8.15 | 8.20 |
| $Na_2O$ | 0.05 | 0.05 | 0.05 | 0.00 | 0.07 |
| $K_2O$ | 0.08 | 0.08 | 0.08 | 0.06 | 0.09 |
| $Y_2O_3$ | 0.50 | 0.00 | 0.00 | 0.50 | 0.00 |
| $F_2$ | 0.01 | 0.01 | 0.01 | 0.01 | 0.01 |
| $TiO_2$ | 0.57 | 0.58 | 0.59 | 0.61 | 0.62 |
| $Li_2O$ | 0.00 | 0.00 | 0.00 | 0.00 | 0.00 |
| $Li_2O + MgO + Al_2O_3$ | 22.4 | 22.4 | 22.55 | 22.4 | 23.7 |
| CaO/MgO | 1.88 | 1.81 | 1.81 | 1.87 | 1.88 |
| $Al_2O_3/(Al_2O_3 + CaO + MgO)$ | 0.38 | 0.38 | 0.40 | 0.38 | 0.41 |
| $SiO_2/Al_2O_3$ | 4.27 | 4.33 | 4.24 | 4.28 | 3.92 |
| Young's modulus, E (GPa) | 88.7 | 88.7 | 88.1 1 | 88.1 | 88.5 |
| Fiber density, d (g/cm3) | 2.64 | 2.62 | 2.61 | 2.61 | 2.59 |
| Liquidus, $T_L$ (° C.) | 1214 | 1220 | 1219 | 1225 | 1219 |
| Forming, $T_F$ (° C.) | 1289 | 1302 | 1314 | 1296 | 1299 |
| Delta T (° C.) | 75 | 82 | 95 | 71 | 80 |
| Melting, $T_M$ (° C.) | 1475 | 1493 | 1508 | 1481 | 1489 |
| Oxide (wt. %) | Ex 6 | Ex 7 | Ex 8 | Ex 9 | Ex 10 |
| $SiO_2$ | 61.87 | 61.20 | 61.52 | 61.55 | 60.47 |
| $Al_2O_3$ | 14.22 | 14.24 | 14.11 | 14.01 | 14.16 |
| $Fe_2O_3$ | 0.30 | 0.30 | 0.30 | 0.30 | 0.32 |
| CaO | 14.69 | 15.45 | 15.03 | 15.08 | 15.48 |
| MgO | 8.20 | 8.10 | 8.32 | 8.35 | 8.23 |
| $Na_2O$ | 0.05 | 0.05 | 0.05 | 0.05 | 0.12 |
| $K_2O$ | 0.08 | 0.08 | 0.08 | 0.08 | 0.10 |
| $Y_2O_3$ | 0.00 | 0.00 | 0.00 | 0.00 | 0.49 |
| $F_2$ | 0.01 | 0.01 | 0.01 | 0.01 | 0.01 |
| $TiO_2$ | 0.58 | 0.58 | 0.57 | 0.57 | 0.61 |
| $Li_2O$ | 0.00 | 0.00 | 0.00 | 0.00 | 0.00 |
| $Li_2O + MgO + Al_2O_3$ | 22.4 | 22.3 | 22.4 | 22.4 | 22.4 |
| CaO/MgO | 1.79 | 1.91 | 1.81 | 1.81 | 1.88 |
| $Al_2O_3/(Al_2O_3 + CaO + MgO)$ | 0.38 | 0.38 | 0.38 | 0.37 | 0.37 |
| $SiO_2/Al_2O_3$ | 4.35 | 4.30 | 4.36 | 4.39 | 4.27 |
| Young's modulus, E (GPa) | 88.4 | 88.4 | 88.4 | 88.7 | 88.4 |
| Fiber density, d (g/cm3) | 2.62 | 2.63 | 2.63 | 2.63 | 2.63 |
| Liquidus, $T_L$ (° C.) | 1217 | 1226 | 1216 | 1220 | 1199 |
| Forming, $T_F$ (° C.) | 1301 | 1287 | 1295 | 1295 | 1285 |
| Delta T (° C.) | 84 | 61 | 79 | 75 | 86 |
| Melting, $T_M$ (° C.) | 1492 | 1475 | 1483 | 1484 | 1472 |
| Oxide (wt. %) | Ex 11 | Ex 12 | Ex 13 | Ex 14 | Ex 15 |
| $SiO_2$ | 60.78 | 60.84 | 60.91 | 60.97 | 60.57 |
| $Al_2O_3$ | 14.53 | 14.86 | 15.18 | 15.51 | 15.45 |
| $Fe_2O_3$ | 0.31 | 0.32 | 0.32 | 0.33 | 0.32 |

TABLE 1-continued

| | | | | | |
|---|---|---|---|---|---|
| CaO | 15.07 | 14.78 | 14.49 | 14.20 | 14.49 |
| MgO | 8.15 | 8.11 | 8.06 | 8.02 | 8.17 |
| $Na_2O$ | 0.06 | 0.06 | 0.07 | 0.07 | 0.07 |
| $K_2O$ | 0.08 | 0.08 | 0.08 | 0.08 | 0.09 |
| $Y_2O_3$ | 0.37 | 0.25 | 0.12 | 0.00 | 0.00 |
| $F_2$ | 0.01 | 0.01 | 0.01 | 0.01 | 0.01 |
| $TiO_2$ | 0.58 | 0.59 | 0.60 | 0.61 | 0.62 |
| $Li_2O$ | 0.05 | 0.10 | 0.15 | 0.20 | 0.22 |
| $Li_2O + MgO + Al_2O_3$ | 22.7 | 23.1 | 23.4 | 23.7 | 23.8 |
| CaO/MgO | 1.85 | 1.82 | 1.80 | 1.77 | 1.88 |
| $Al_2O_3/(Al_2O_3 + CaO + MgO)$ | 0.38 | 0.39 | 0.40 | 0.41 | 0.41 |
| $SiO_2/Al_2O_3$ | 4.18 | 4.09 | 4.01 | 3.93 | 3.92 |
| Young's modulus, E (GPa) | 88.4 | 88.7 | 88.2 | 88.7 | 88.8 |
| Fiber density, d (g/cm3) | 2.64 | 2.63 | 2.63 | 2.62 | 2.60 |
| Liquidus, $T_L$ (° C.) | 1211 | 1209 | 1203 | 1207 | 1199 |
| Forming, $T_F$ (° C.) | 1289 | 1289 | 1290 | 1290 | 1291 |
| Delta T (° C.) | 78 | 80 | 87 | 83 | 92 |
| Melting, $T_M$ (° C.) | 1475 | 1477 | 1480 | 1481 | 1482 |

| Oxide (wt. %) | Ex 16 | Ex 17 | Ex 18 | Ex 19 | Ex 20 |
|---|---|---|---|---|---|
| $SiO_2$ | 62.45 | 60.92 | 60.32 | 60.17 | 59.99 |
| $Al_2O_3$ | 14.64 | 15.54 | 14.23 | 14.35 | 14.31 |
| $Fe_2O_3$ | 0.27 | 0.29 | 0.34 | 0.34 | 0.34 |
| CaO | 13.73 | 15.83 | 15.37 | 15.20 | 15.15 |
| MgO | 7.74 | 6.17 | 8.17 | 8.20 | 8.18 |
| $Na_2O$ | 0.07 | 0.07 | 0.07 | 0.07 | 0.07 |
| $K_2O$ | 0.08 | 0.09 | 0.08 | 0.08 | 0.08 |
| $Y_2O_3$ | 0.00 | 0.00 | 0.83 | 0.99 | 1.28 |
| $F_2$ | 0.01 | 0.01 | 0.01 | 0.01 | 0.01 |
| $TiO_2$ | 0.59 | 0.63 | 0.58 | 0.58 | 0.58 |
| $Li_2O$ | 0.41 | 0.44 | 0.00 | 0.00 | 0.00 |
| $Li_2O + MgO + Al_2O_3$ | 22.8 | 22.2 | 22.4 | 22.6 | 22.5 |
| CaO/MgO | 1.88 | 1.88 | 1.88 | 1.88 | 1.88 |
| $Al_2O_3/(Al_2O_3 + CaO + MgO)$ | 0.41 | 0.41 | 0.38 | 0.38 | 0.38 |
| $SiO_2/Al_2O_3$ | 4.27 | 3.92 | 4.23 | 4.19 | 4.19 |
| Young's modulus, E (GPa) | 88.2 | 88.0 | 89.1 | 88.5 | 88.5 |
| Fiber density, d (g/cm3) | 2.59 | 2.64 | 2.63 | 2.65 | 2.64 |
| Liquidus, $T_L$ (° C.) | 1209 | 1210 | 1210 | 1211 | 1207 |
| Forming, $T_F$ (° C.) | 1308 | 1293 | 1287 | 1277 | 1280 |
| Delta T (° C.) | 99 | 83 | 77 | 66 | 73 |
| Melting, $T_M$ (° C.) | 1513 | 1492 | 1472 | 1461 | 1463 |

| Oxide (wt. %) | Ex 21 | Ex 22 | Ex 23 | Ex 24 | Ex 25 |
|---|---|---|---|---|---|
| $SiO_2$ | 60.16 | 59.94 | 60.01 | 60.24 | 60.32 |
| $Al_2O_3$ | 14.29 | 14.23 | 14.47 | 13.94 | 14.01 |
| $Fe_2O_3$ | 0.34 | 0.34 | 0.34 | 0.33 | 0.34 |
| CaO | 15.20 | 16.17 | 16.22 | 16.11 | 15.55 |
| MgO | 8.17 | 8.02 | 7.66 | 8.11 | 8.19 |
| $Na_2O$ | 0.07 | 0.07 | 0.07 | 0.07 | 0.11 |
| $K_2O$ | 0.08 | 0.08 | 0.08 | 0.08 | 0.08 |
| $Y_2O_3$ | 1.10 | 0.56 | 0.58 | 0.56 | 0.87 |
| $F_2$ | 0.01 | 0.01 | 0.01 | 0.01 | 0.01 |
| $TiO_2$ | 0.58 | 0.58 | 0.58 | 0.56 | 0.51 |
| $Li_2O$ | 0.00 | 0.00 | 0.00 | 0.00 | 0.00 |
| $Li_2O + MgO + Al_2O_3$ | 22.5 | 22.26 | 22.14 | 22.05 | 22.15 |
| CaO/MgO | 1.88 | 2.02 | 2.12 | 1.99 | 1.88 |
| $Al_2O_3/(Al_2O_3 + CaO + MgO)$ | 0.38 | 0.37 | 0.38 | 0.37 | 0.41 |
| $SiO_2/Al_2O_3$ | 4.21 | 4.21 | 4.15 | 4.32 | 4.3 |
| Young's modulus, E (GPa) | 88.0 | 88.4 | 88.1 | 88.5 | 88.7 |
| Fiber density, d (g/cm3) | 2.64 | 2.65 | 2.65 | 2.64 | 2.63 |
| Liquidus, $T_L$ (° C.) | 1211 | 1218 | 1213 | 1224 | 1217 |
| Forming, $T_F$ (° C.) | 1278 | 1280 | 1283 | 1276 | 1280 |
| Delta T (° C.) | 67 | 62 | 70 | 52 | 63 |
| Melting, $T_M$ (° C.) | 1464 | 1464 | 1468 | 1460 | 1457 |

Desirable characteristics that can be exhibited by various but not necessarily all embodiments of the present invention can include, but are not limited to, the following: the provision of glass fibers, fiber glass strands, glass fiber fabrics, prepregs, and other products useful for reinforcement applications; and others.

Illustrative embodiments of suitable compositions, fibers, composites, products.

As used below, any reference to compositions, composites, or products is to be understood as a reference to each of the those compositions, composites, or products disjunctively (e.g., "Illustrative embodiments 1-4 is to be understood as illustrative embodiment 1, 2, 3, or 4").

Illustrative embodiment 1 is a glass composition suitable for fiber forming comprising: $SiO_2$ from about 60 to about 63 weight percent, $Al_2O_3$ from about 14 to about 16 weight percent, CaO from about 14 to about 16.5 weight percent, MgO from about 6 to about 8.5 weight percent, $Fe_2O_3$ less than 1 weight percent, $TiO_2$ less than 1 weight percent, wherein the composition is substantially free of $Li_2O$ and the ($Li_2O+MgO+Al_2O_3$) content ranges from about 22 up to 24 weight percent.

Illustrative embodiment 2 is the composition of any preceding or subsequent illustrative embodiment, wherein a ratio of CaO to MgO, (CaO/MgO), ranges from about 1.7 to about 2.0.

Illustrative embodiment 3 is the composition of any preceding or subsequent illustrative embodiment, wherein a ratio of $SiO_2$ to $Al_2O_3$, ($SiO_2 /Al_2O_3$), ranges from about 3.5 to about 4.5.

Illustrative embodiment 4 is the composition of any preceding or subsequent illustrative embodiment, wherein the ($Li_2O+MgO+Al_2O_3$) content ranges from about 22 up to 23 weight percent.

Illustrative embodiment 5 is the composition of any preceding or subsequent illustrative embodiment, wherein a ratio of $Al_2O_3$ to ($Al_2O_3+MgO+CaO$ ), ($Al_2O_3/(Al_2O_3+ MgO+CaO$ )), ranges from about 0.35 to about 0.45.

Illustrative embodiment 6 is the composition of any preceding or subsequent illustrative embodiment, wherein the composition is substantially free of $F_2$.

Illustrative embodiment 7 is the composition of any preceding or subsequent illustrative embodiment, further comprising up to 0.2 weight percent $Na_2O$.

Illustrative embodiment 8 is the composition of any preceding or subsequent illustrative embodiment, further comprising up to 0.2 weight percent $K_2O$.

Illustrative embodiment 9 is a plurality of glass fibers formed from the glass composition of any of preceding or subsequent illustrative embodiments.

Illustrative embodiment 10 is the plurality of glass fibers of any preceding or subsequent illustrative embodiment, wherein the glass fibers have a modulus greater than 85 GPa.

Illustrative embodiment 11 is the plurality of glass fibers of any preceding or subsequent illustrative embodiment, wherein the glass fibers have a density less than 2.7 g/cm³.

Illustrative embodiment 12 is the plurality of glass fibers of any preceding or subsequent illustrative embodiment, wherein the glass fibers have a forming temperature ($T_F$) of less than 1350° C.

Illustrative embodiment 13 is the plurality of glass fibers of any preceding or subsequent illustrative embodiment, wherein the glass fibers have a liquidus temperature ($T_L$) of less than 1250° C.

Illustrative embodiment 14 is a fiber glass strand comprising the plurality of glass fibers of any preceding or subsequent illustrative embodiment.

Illustrative embodiment 15 is a roving comprising the plurality of glass fibers of any preceding or subsequent illustrative embodiment.

Illustrative embodiment 16 is a yarn comprising the plurality of glass fibers of any preceding or subsequent illustrative embodiment.

Illustrative embodiment 17 is a woven fabric comprising the plurality of glass fibers of any preceding or subsequent illustrative embodiment.

Illustrative embodiment 18 is a non-woven fabric comprising the plurality of glass fibers of any preceding or subsequent illustrative embodiment.

Illustrative embodiment 19 is a chopped fiber glass strand comprising the plurality of glass fibers of any preceding or subsequent illustrative embodiment.

Illustrative embodiment 20 is a polymeric composite comprising: a polymeric material; and a plurality of glass fibers formed from the glass composition of any preceding or subsequent illustrative embodiment.

Illustrative embodiment 21 is the polymeric composite of any preceding or subsequent illustrative embodiment, wherein the plurality of glass fibers are in the form of a non-woven fabric.

Illustrative embodiment 22 is the polymeric composite of any preceding or subsequent illustrative embodiment, wherein the plurality of glass fibers are in the form of a woven fabric.

Illustrative embodiment 23 is the polymeric composite of any preceding or subsequent illustrative embodiment, wherein the polymeric material comprises a thermoplastic polymer.

Illustrative embodiment 24 is the polymeric composite of any preceding or subsequent illustrative embodiment, wherein the polymeric material comprises a thermosetting polymer.

Illustrative embodiment 25 is an article of manufacture comprising a plurality of glass fibers formed from the glass composition of any preceding or subsequent illustrative embodiment.

Illustrative embodiment 26 is a glass composition suitable for fiber forming comprising: $SiO_2$ from about 60 to about 63 weight percent, $Al_2O_3$ from about 14 to about 16 weight percent, CaO from about 14 to about 16.5 weight percent, MgO from about 6 to about 8.5 weight percent, $Fe_2O_3$ less than 1 weight percent, $TiO_2$ less than 1 weight percent, and $RE_2O_3$ is present in an amount greater than 0 weight percent and less than 1 weight percent, wherein the composition is substantially free of $Li_2O$.

Illustrative embodiment 27 is a glass composition suitable for fiber forming comprising: $SiO_2$ from about 59 to about 63 weight percent, $Al_2O_3$ from about 13.7 to about 16 weight percent, CaO from about 14 to about 16.5 weight percent, MgO from about 6 to about 8.5 weight percent, $Fe_2O_3$ less than 1 weight percent, $TiO_2$ less than 1 weight percent, and $RE_2O_3$ is present in an amount greater than 0 weight percent and less than 1.5 weight percent, wherein the composition is substantially free of $Li_2O$.

Illustrative embodiment 28 is the glass composition of any preceding or subsequent illustrative embodiment, wherein a ratio of $SiO_2$ to $Al_2O_3$, ($SiO_2$/$Al_2O_3$), ranges from about 3.6 to about 4.6.

Illustrative embodiment 29 is the glass composition of any preceding or subsequent illustrative embodiment, wherein a ratio of $Al_2O_3$ to ($Al_2O_3$+MgO+CaO ), ($Al_2O_3$/($Al_2O_3$+MgO+CaO )), ranges from about 0.33 to about 0.47.

Illustrative embodiment 30 is the glass composition of any preceding or subsequent illustrative embodiment, wherein a ratio of CaO to MgO, (CaO/MgO), ranges from about 1.6 to about 2.8.

Illustrative embodiment 31 is a glass composition suitable for fiber forming comprising: $SiO_2$ from about 60 to about 63 weight percent, $Al_2O_3$ from about 14 to about 16 weight percent, CaO from about 14 to about 16.5 weight percent, MgO from about 6 to about 8.5 weight percent, $Fe_2O_3$ less than 1 weight percent, $TiO_2$ less than 1 weight percent, $Li_2O$ less than 0.5 weight percent, and $RE_2O_3$ is present in an amount greater than 0 weight percent and less than 1 weight percent, wherein the ($Li_2O$+MgO+$Al_2O_3$) content ranges from about 22 up to 24 weight percent.

Illustrative embodiment 32 is a glass composition suitable for fiber forming comprising: $SiO_2$ from about 60 to about 63 weight percent, $Al_2O_3$ from about 14 to about 16 weight percent, CaO from about 14 to about 16.5 weight percent, MgO from about 6 to about 8.5 weight percent, $Fe_2O_3$ less than 1 weight percent, $TiO_2$ less than 1 weight percent, and $Li_2O$ is present in an amount greater than 0 weight percent and less than 0.5 weight percent, wherein the ($Li_2O$+MgO+$Al_2O_3$) content ranges from about 22 up to 23 weight percent.

Illustrative embodiment 33 is a plurality of glass fibers formed from a glass composition comprising: $SiO_2$ from about 60 to about 63 weight percent, $Al_2O_3$ from about 14 to about 16 weight percent, CaO from about 14 to about 16.5 weight percent, MgO from about 6 to about 8.5 weight percent, $Fe_2O_3$ less than 1 weight percent, $TiO_2$ less than 1 weight percent, and $Li_2O$ is present in an amount greater than 0 weight percent and less than 0.5 weight percent, wherein the ($Li_2O$+MgO+$Al_2O_3$) content ranges from about 22 up to 24 weight percent, and the Young's modulus is greater than 85 GPa.

Illustrative embodiment 34 is the plurality of glass fibers any preceding or subsequent illustrative embodiment, wherein the Young's modulus is greater than 88 GPa.

Illustrative embodiment 35 is any of the foregoing illustrative embodiments, wherein the $Al_2O_3$/($Al_2O_3$+MgO+CaO ) ratio ranges between 0.35 to 0.45.

Illustrative embodiment 36 is any of the foregoing illustrative embodiments, wherein the $Al_2O_3$/($Al_2O_3$+MgO+CaO ) ratio is less than 0.40.

Illustrative embodiment 37 is any of the foregoing illustrative embodiments, wherein the $Al_2O_3$/($Al_2O_3$+MgO+CaO ) ratio ranges from 0.37 to 0.42.

Various embodiments of the invention have been described herein. It should be recognized that these embodiments are merely illustrative of the present invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated or otherwise clearly contradicted by context.

It is to be understood that the present description illustrates aspects of the invention relevant to a clear understanding of the invention. Certain aspects of the invention that would be apparent to those of ordinary skill in the art and that, therefore, would not facilitate a better understanding of the invention have not been presented in order to simplify the present description. Although the present invention has been described in connection with certain embodiments, the present invention is not limited to the particular embodiments disclosed, but is intended to cover modifications that are within the spirit and scope of the invention.

What is claimed:

1. A glass composition suitable for fiber forming comprising:
   $SiO_2$ from 60 to 63 weight percent;
   $Al_2O_3$ from 14 to 16 weight percent;
   CaO from 14 to 16.5 weight percent;
   MgO from 6 to 8.5 weight percent;
   $Fe_2O_3$ less than 1 weight percent; and
   $TiO_2$ present in an amount less than 1 weight percent,
   wherein a ratio of $SiO_2$ to $Al_2O_3$, ($SiO_2/Al_2O_3$), is greater than 4.0, and
   wherein the composition is substantially free of $Li_2O$ and the ($Li_2O+MgO+Al_2O_3$) content ranges from 22 up to 24 weight percent.

2. The glass composition of claim 1, wherein the composition is substantially free of $F_2$.

3. The glass composition of claim 1, further comprising up to 0.2 weight percent $Na_2O$.

4. The glass composition of claim 1, further comprising up to 0.2 weight percent $K_2O$.

5. The glass composition of claim 1, wherein the ($Li_2O+MgO+Al_2O_3$) content ranges from 22 up to 23 weight percent.

6. The glass composition of claim 1, wherein a ratio of CaO to MgO, (CaO/MgO), ranges from 1.7 to 2.0.

7. The glass composition of claim 1, wherein a ratio of $SiO_2$ to $Al_2O_3$, ($SiO_2/Al_2O_3$), ranges from greater than 4.0 to 4.5.

8. The glass composition of claim 1, wherein a ratio of $Al_2O_3$ to ($Al_2O_3+MgO+CaO$), ($Al_2O_3/(Al_2O_3+MgO+CaO)$), ranges from 0.35 to 0.45.

9. A plurality of glass fibers formed from the glass composition of claim 1.

10. The plurality of glass fibers of claim 9, wherein the glass fibers have a Young's modulus greater than 85 GPa.

11. The plurality of glass fibers of claim 9, wherein the glass fibers have a density less than 2.7 g/cm$^3$.

12. The plurality of glass fibers of claim 9, wherein the glass fibers have a forming temperature ($T_F$) of less than 1350° C.

13. The plurality of glass fibers of claim 9, wherein the glass fibers have a liquidus temperature ($T_L$) of less than 1250° C.

14. A fiber glass strand comprising the plurality of glass fibers of claim 9.

15. A roving comprising the plurality of glass fibers of claim 9.

16. A yarn comprising the plurality of glass fibers of claim 9.

17. A woven fabric comprising the plurality of glass fibers of claim 9.

18. A non-woven fabric comprising the plurality of glass fibers of claim 9.

19. A chopped fiber glass strand comprising the plurality of glass fibers of claim 9.

20. A polymeric composite comprising:
    a polymeric material; and
    a plurality of glass fibers formed from the glass composition of claim 1.

* * * * *